United States Patent
Bacchus (10) Patent No.: US 12,347,210 B2
(45) Date of Patent: Jul. 1, 2025

(54) LANE EDGE FUSION SYSTEM FOR AN AUTONOMOUS VEHICLE

(71) Applicant: GM Global Technology Operations LLC, Detroit, MI (US)

(72) Inventor: Brent Navin Roger Bacchus, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 389 days.

(21) Appl. No.: 18/159,370

(22) Filed: Jan. 25, 2023

(65) Prior Publication Data

US 2024/0249534 A1 Jul. 25, 2024

(51) Int. Cl.
*G06V 20/56* (2022.01)
*B60W 30/12* (2020.01)
(Continued)

(52) U.S. Cl.
CPC ........... *G06V 20/588* (2022.01); *B60W 30/12* (2013.01); *B60W 30/18163* (2013.01);
(Continued)

(58) Field of Classification Search
CPC .... G06V 20/588; G06V 10/80; G06V 10/803; G06F 17/11; G06T 7/10; G06T 7/12; G06T 7/13; G06T 7/149; G06T 7/181; G06T 7/187; G06T 7/30; G06T 7/32; G06T 7/35; G06T 7/60; G06T 7/62; G06T 2207/10028; G06T 2207/20096; G06T 2207/20101; G06T 2207/20161; G06T 2207/20164; G06T 2207/20168; G06T 2207/20221; G06T 2207/30236; G06T 2207/30256; G06T 2207/30252; B60W 2050/0043;
(Continued)

(56) References Cited

U.S. PATENT DOCUMENTS

| | | | | |
|---|---|---|---|---|
| 2021/0365694 A1* | 11/2021 | Lee | ...................... | G06V 20/588 |
| 2023/0083965 A1* | 3/2023 | Liu | ........................... | G06T 7/74 |
| | | | | 382/103 |
| 2023/0150532 A1* | 5/2023 | Hafner | .............. | B60W 30/0953 |
| | | | | 701/23 |

FOREIGN PATENT DOCUMENTS

CN 112507977 A * 3/2021 ......... G06K 9/00798

OTHER PUBLICATIONS

Bacchus et al., Claims of U.S. Appl. No. 19/013,370, filed Jan. 8, 2025, 12 pages. (Year: 2025).*

(Continued)

*Primary Examiner* — Henok Shiferaw
*Assistant Examiner* — Dennis Rosario
(74) *Attorney, Agent, or Firm* — Vivacqua Crane, PLLC (57) ABSTRACT

A lane edge fusion system for an autonomous vehicle includes one or more controllers executing instructions to receive perception data and map data of a roadway the autonomous vehicle is traveling along. The one or more controllers derive a plurality of map lane edge points from the map data and a plurality of perception lane edge points from the perception data and select an evaluation point based on the plurality of map lane edge points and the plurality of perception lane edge points. The one or more controllers fit an implicit function for the evaluation point based on an implicit moving least squares approach. The one or more controllers build a fused lane edge by setting a point on the implicit curve as one of a plurality fused lane edge points.

20 Claims, 4 Drawing Sheets

(51) Int. Cl.
| | |
|---|---|
| *B60W 30/18* | (2012.01) |
| *G01C 21/00* | (2006.01) |
| *G01C 21/36* | (2006.01) |
| *G06T 7/13* | (2017.01) |
| *G06T 7/181* | (2017.01) |
| *G06V 10/80* | (2022.01) |

(52) U.S. Cl.
CPC ..... *G01C 21/3602* (2013.01); *G01C 21/3635* (2013.01); *G01C 21/3658* (2013.01); *G01C 21/38* (2020.08); *G01C 21/3811* (2020.08); *G01C 21/3815* (2020.08); *G01C 21/3819* (2020.08); *G01C 21/3867* (2020.08); *G06T 7/13* (2017.01); *G06T 7/181* (2017.01); *G06V 10/80* (2022.01); *G06V 10/803* (2022.01); *B60W 2552/10* (2020.02); *B60W 2552/53* (2020.02); *B60W 2554/4045* (2020.02); *B60W 2556/35* (2020.02); *G06T 2207/10028* (2013.01); *G06T 2207/20161* (2013.01); *G06T 2207/20221* (2013.01); *G06T 2207/30256* (2013.01)

(58) Field of Classification Search
CPC ........... B60W 30/12; B60W 30/18163; B60W 2552/10; B60W 2552/53; B60W 2554/4045; B60W 2556/35; G01C 21/3602; G01C 21/3635; G01C 21/3658; G01C 21/38; G01C 21/3811; G01C 21/3815; G01C 21/3819; G01C 21/3863; G01C 21/3867
See application file for complete search history.

(56) References Cited

OTHER PUBLICATIONS

Search machine translation, A Lane Line Locating Method, Device and Electronic Device of CN 112507977 A to Hu et al., translated Apr. 10, 2025,13 pages. (Year: 2025).*
Guennebaud et al. "Algebraic point set surfaces," ACM siggraph 2007 papers. Jul. 2007. 23-es.
Manoj et al. "A Closed-form Estimate of 3D ICP Covariance," 2015 14th IAPR International Conference on Machine Vision Applications (MVA), May 2015, IEEE.

* cited by examiner

LANE EDGE FUSION SYSTEM FOR AN AUTONOMOUS VEHICLE

INTRODUCTION

The present disclosure relates to a lane edge fusion system for an autonomous vehicle that determines a fused lane edge based on map data and perception data.

An autonomous driving system for a vehicle is a complex system that includes many different aspects. For example, an autonomous driving system may include multiple sensors to gather perception data with respect to the vehicle's surrounding environment. In addition to the sensors, the autonomous driving system may also utilize map data as well.

Map lane edge points are derived from the map data, while perception lane edge points are derived from the perception data. The map lane edge points may be fused together with the perception lane edge points to determine lane edge points that are utilized by the autonomous driving system. However, the map lane edge points and the perception lane edge points may include noisy sample points. Moreover, the variance of the lateral error as measured from the true lane edge may vary over distance for both the noisy map lane edge points and the perception lane edge points. Sometimes the true lane edge forms a curve that goes back on itself and subsequently fails the vertical line test, which makes it difficult to model the true lane edge points as a single function. To address this issue, a parametric function may be used to fuse the map and perception data together, however, it may be challenging to find consistent parameterization with noisy data.

Thus, while autonomous driving systems achieve their intended purpose, there is a need in the art for determining an improved approach to fuse the map lane edge points and the perception lane edge points together.

SUMMARY

According to several aspects, a lane edge fusion system for an autonomous vehicle is disclosed. The lane edge fusion system includes one or more controllers executing instructions to receive perception data and map data of a roadway the autonomous vehicle is traveling along. The one or more controllers derive a plurality of map lane edge points from the map data and a plurality of perception lane edge points from the perception data. The one or more controllers select an evaluation point based on the plurality of map lane edge points and the plurality of perception lane edge points, where a true position of a lane edge is represented as an implicit curve. The one or more controllers fit an implicit function for the evaluation point based on an implicit moving least squares approach, where the implicit curve is represented by a zero-level set of the implicit function and the implicit function is represented by an equation for a planar circle. The one or more controllers solve for a plurality of coefficients of the implicit function, wherein the plurality of coefficients are a function of the evaluation point. The one or more controllers estimate a covariance of the plurality of coefficients. The one or more controllers determine a point on the implicit curve that is nearest to a given point based on an iterative process. The one or more controllers determine a lateral error variance at the point based on the covariance for the plurality of coefficients. Finally, the one or more controllers build a fused lane edge by setting the point on the implicit curve as one of a plurality fused lane edge points that are fused together to create the fused lane edge.

In another aspect, the implicit function is expressed as:

$$f(x) = b(x)^T c(x)$$

where $f(x)$ represents the implicit function, $b(x)$ represents a quadratic basis vector, and $c(x)$ is equal to a vector of the plurality of coefficients $c_x$.

In still another aspect, the equation of the planar circle is expressed as:

$$f(x) = c_0 + c_1 x + c_2 y + c_3(x^2 + y^2) = 0$$

where $c_0$, $c_1$, $c_2$, $c_3$ represent the plurality of coefficients, $x=x_1$, and $y=x_2$.

In an aspect, the evaluation point includes an error expressed as:

$$\epsilon' \sim \mathcal{N}(0, \Sigma)$$

where $\epsilon'$ represents the error, $\mathcal{N}$ represents the Normal distribution with zero mean, and $\Sigma$ represents a covariance matrix.

In another aspect, the plurality of coefficients are estimated based on a Lagrangian function including a first loss function and a second loss function.

In still another aspect, the covariance of the plurality of coefficients is estimated based on an optimization problem that minimizes a Lagrangian function and is expressed as:

$$c_x = \arg\min_c L(z, c)$$

where $c_x$ represents the plurality of coefficients, $L(z, c)$ represents the Lagrangian function, and $z$ represents noisy observations.

In an aspect, the covariance of the plurality of coefficients is expressed as:

$$\Sigma_c \approx (BW\Sigma_z^{-1}B^T)^{-1} BW\Sigma_z^{-1} W B^T (BW\Sigma_z^{-1}B^T)^{-1}$$

where $\Sigma_c$ represents the covariance of the plurality of coefficients, B represents a matrix formed by stacking basis vectors at each point so that B satisfies $B=(b_1\ b_2\ \ldots)$, W is a diagonal matrix of a positive weighting function $w_i$, and $\Sigma_z$ represents a covariance for noisy observations.

In another aspect, the lateral error variance at the point is determined based on:

$$\sigma_x^2 = J\Sigma_c J^T$$

where $\sigma_x^2$ is the lateral error variance, $\Sigma_c$ is the covariance for the plurality of coefficients, and J is a Jacobian matrix with respect to a vector of the plurality of coefficients ($c_0$, $c_1$, $c_2$, $c_3$) of a function r(c) that represents a radius of a surface given the vector of the plurality of coefficients ($c_0$, $c_1$, $c_2$, $c_3$).

In still another aspect, the function r(c) is expressed as:

$$r(c) = \sqrt{\frac{c_1^2 + c_2^2}{2c_3^2} - c_0/c_3}.$$

In an aspect, for each point that is evaluated as part of the iterative process, the plurality of coefficients are solved for based on:

$$x_{center} = -\frac{1}{2c_3}(c_1 \ c_2)^T$$

where $x_{center}$ represents center coordinates of the planar circle and $c_1$, $c_2$ represent the plurality of coefficients.

In another aspect, for each point that is evaluated as part of the iterative process, the plurality of coefficients are solved for based on:

$$r = \sqrt{x_{center}^T x_{center} - \frac{c_0}{c_3}}$$

where r represents a radius of the planar circle and $c_0$, $c_3$ represent the plurality of coefficients.

In still another aspect, a next point on the planar circle nearest to a given point at iteration n is determined based on:

$$\tilde{x}_{n+1} = x_{center} + \frac{\tilde{x}_n - x_{center}}{\|\tilde{x}_n - x_{center}\|}r$$

where $\tilde{X}_{n+1}$ represents the next point that is selected for evaluation and $\tilde{x}_n$ represents a given point at the iteration n.

In an aspect, a gradient constraint is enforced at the zero-level set of the implicit function.

In another aspect, the gradient constraint is expressed as a magnitude squared of a gradient of the implicit function, where the implicit function is equal to 1, and the evaluation point belongs to the zero-level set of the implicit function.

In still another aspect, the fused lane edge defines a shape of a lane located along the roadway that the autonomous vehicle travels along.

In an aspect, a lane edge fusion system for an autonomous vehicle is disclosed, and includes one or more controllers executing instructions to receive perception data and map data of a roadway the autonomous vehicle is traveling along. The one or more controllers derive a plurality of map lane edge points from the map data and a plurality of perception lane edge points from the perception data. The one or more controllers select an evaluation point based on the plurality of map lane edge points and the plurality of perception lane edge points, wherein a true position of a lane edge is represented as an implicit curve. The one or more controllers fit an implicit function for the evaluation point based on an implicit moving least squares approach, where the implicit curve is represented by a zero-level set of the implicit function and the implicit function is represented by an equation for a planar circle, and where a gradient constraint is enforced at the zero-level set of the implicit function. The one or more controllers solve for a plurality of coefficients of the implicit function, where the plurality of coefficients are a function of the evaluation point and are estimated based on a Lagrangian function including a first loss function and a second loss function. The one or more controllers estimate a covariance of the plurality of coefficients. The one or more controllers determine a point on the implicit curve that is nearest to a given point based on an iterative process. The one or more controllers determine a lateral error variance at the point based on the covariance for the plurality of coefficients. Finally, the one or more controllers build a fused lane edge by setting the point on the implicit curve as one of a plurality fused lane edge points that are fused together to create the fused lane edge, and the fused lane edge defines a shape of a lane located along the roadway that the autonomous vehicle travels along.

In another aspect, the lateral error variance at the point is determined based on:

$$\sigma_x^2 = J\Sigma_c J^T$$

where $\sigma_x^2$ is the lateral error variance, $\Sigma_c$ is the covariance for the plurality of coefficients, and J is a Jacobian matrix with respect to a vector of the plurality of coefficients ($c_0$, $c_1$, $c_2$, $c_3$) of a function r(c) that represents a radius of a surface given the vector of the plurality of coefficients ($c_0$, $c_1$, $c_2$, $c_3$).

In yet another aspect, the function r(c) is expressed as:

$$r(c) = \sqrt{\frac{c_1^2 + c_2^2}{2c_3^2} - c_0/c_3}.$$

In an aspect, the gradient constraint is expressed as a magnitude squared of a gradient of the implicit function, wherein the implicit function is equal to 1, and the evaluation point belongs to the zero-level set of the implicit function.

In another aspect, a lane edge fusion system for an autonomous vehicle is disclosed, and comprises one or more controllers executing instructions to receive perception data and map data of a roadway the autonomous vehicle is traveling along. The one or more controllers derive a plurality of map lane edge points from the map data and a plurality of perception lane edge points from the perception data. The one or more controllers select an evaluation point based on the plurality of map lane edge points and the plurality of perception lane edge points, where a true position of a lane edge is represented as an implicit curve. The one or more controllers fit an implicit function for the evaluation point based on an implicit moving least squares approach, where the implicit curve is represented by a zero-level set of the implicit function and the implicit function is represented by an equation for a planar circle, and a gradient constraint is enforced at the zero-level set of the implicit function and is expressed as a magnitude squared of a gradient of the implicit function. The implicit function is equal to 1, and the evaluation point belongs to the zero-level set of the implicit function. The one or more controllers solve for a plurality of coefficients of the implicit function, where the plurality of coefficients are a function of the evaluation point and are estimated based on a Lagrangian function including a first loss function and a second loss function. The one or more controllers estimate a covariance of the plurality of coefficients. The one or more controllers determine a point on the implicit curve that is nearest to a given point based on an iterative process. The one or more controllers determine a lateral error variance at the point based on the covariance for the plurality of coefficients wherein the lateral error variance at the point is determined based on:

$$\sigma_x^2 = J \sum\nolimits_c J^T$$

where $\sigma_x^2$ is the lateral error variance, $\Sigma_c$ is the covariance for the plurality of coefficients, and J is a Jacobian matrix with respect to a vector of the plurality of coefficients ($c_0$, $c_1$, $c_2$, $c_3$) of a function r(c) that represents a radius of a surface given the vector of the plurality of coefficients ($c_0$, $c_1$, $c_2$, $c_3$). The one or more controllers build a fused lane edge by setting the point on the implicit curve as one of a plurality fused lane edge points that are fused together to create the fused lane edge, and where the fused lane edge defines a shape of a lane located along the roadway that the autonomous vehicle travels along.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
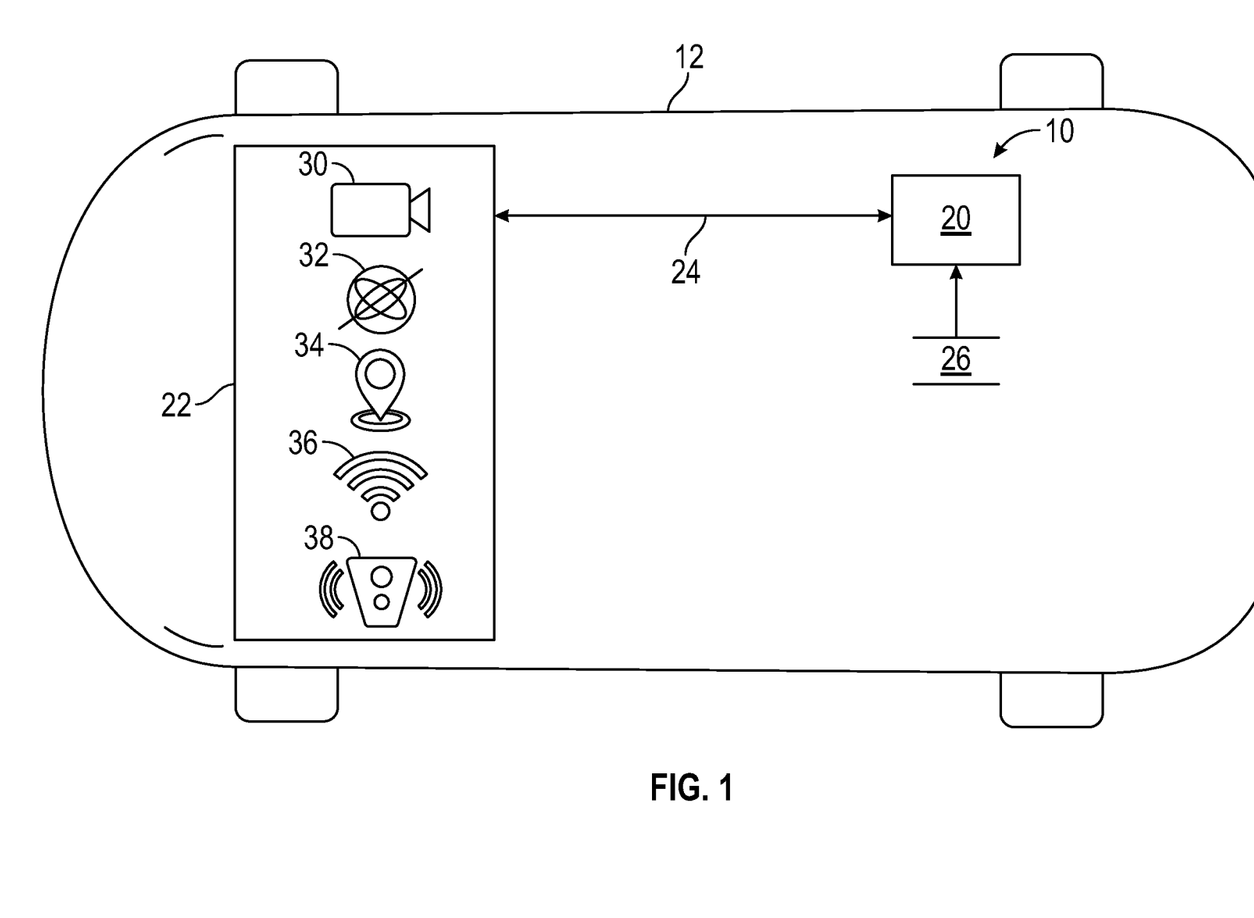
FIG. 1 is a schematic diagram of a vehicle including the disclosed lane edge fusion system, where the lane edge fusion system includes one or more controllers, according to an exemplary embodiment.

Referring to FIG. 1, an exemplary lane edge fusion system 10 for an autonomous vehicle 12 is illustrated. It is to be appreciated that the autonomous vehicle 12 may be any type of vehicle such as, but not limited to, a sedan, truck, sport utility vehicle, van, or motor home. The autonomous vehicle 12 may be a fully autonomous vehicle including an automated driving system (ADS) for performing all driving tasks or a semi-autonomous vehicle including an advanced driver assistance system (ADAS) for assisting a driver with steering, braking, and/or accelerating.

The lane edge fusion system 10 includes one or more controllers 20 in electronic communication with a plurality of sensors 22 configured to collect perception data 24 indicative of roadway the autonomous vehicle 12 is traveling along. In the non-limiting embodiment as shown in FIG. 1, the plurality of sensors 22 include one or more cameras 30, an inertial measurement unit (IMU) 32, a global positioning system (GPS) 34, radar 36, and LiDAR 38, however, is to be appreciated that additional sensors may be used as well. In addition to receiving the perception data 24 from the plurality of sensors 22, the one or more controllers 20 receives map data 26 indicative of the roadway the autonomous vehicle 12 is traveling along.

Figure 2A:
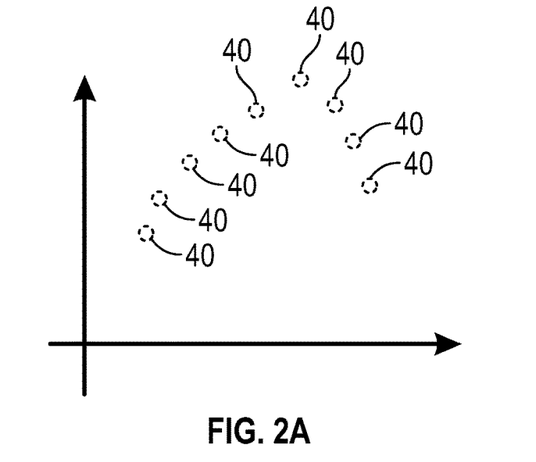
FIG. 2A illustrates a graph including a plurality of map lane edge points, according to an exemplary embodiment.
Figure 2B:
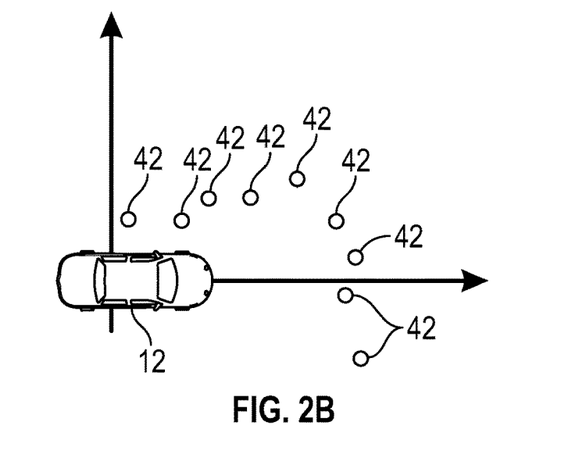
FIG. 2B illustrates a graph including a plurality of perception lane edge points, according to an exemplary embodiment.
Figure 2C:
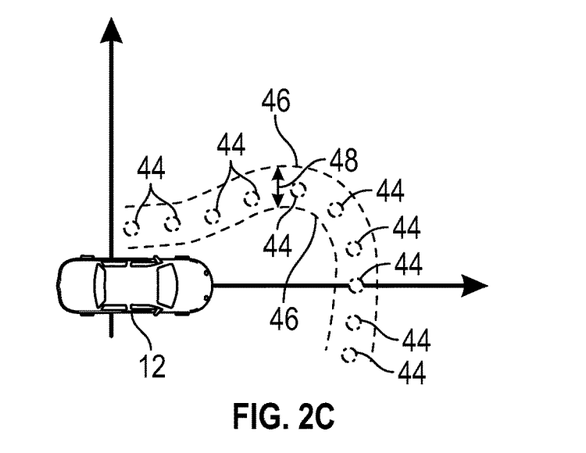
FIG. 2C illustrates a graph including a plurality of lane edge points, according to an exemplary embodiment.

Referring to both FIGS. 1 and 2A, a plurality of map lane edge points 40 are derived from the map data 26. As seen in FIG. 2A, the plurality of map lane edge points 40 are plotted based on the global frame coordinate system. Similarly, FIG. 2B illustrates a plurality of perception lane edge points 42, which are plotted based on the ego frame coordinate system. The perception lane edge points 42 are derived from the same underlying true lane edge points as the map data 26. The one or more controllers 20 determine a plurality of fused lane edge points 44, which are illustrated in FIG. 2C, based on the plurality of map lane edge points 40 (FIG. 2A) and the plurality of perception lane edge points 42 (FIG. 2B). The fused lane edge points 44 are fused together to create a fused lane edge 46. The fused lane edge 46 is drawn as a pair of opposing lane edges 46, where a distance 48 between the fused lane edges 46 represent a confidence interval. The fused lane edge 46 is also expressed in the ego frame coordinate system and defines a shape of a lane located along the roadway that the autonomous vehicle 12 travels along. The fused lane edge 46 provides an improved estimation of an actual position of lane edges when compared to estimating the lane edges based on either the perception data 24 or the map data 26 alone.

Figure 3:
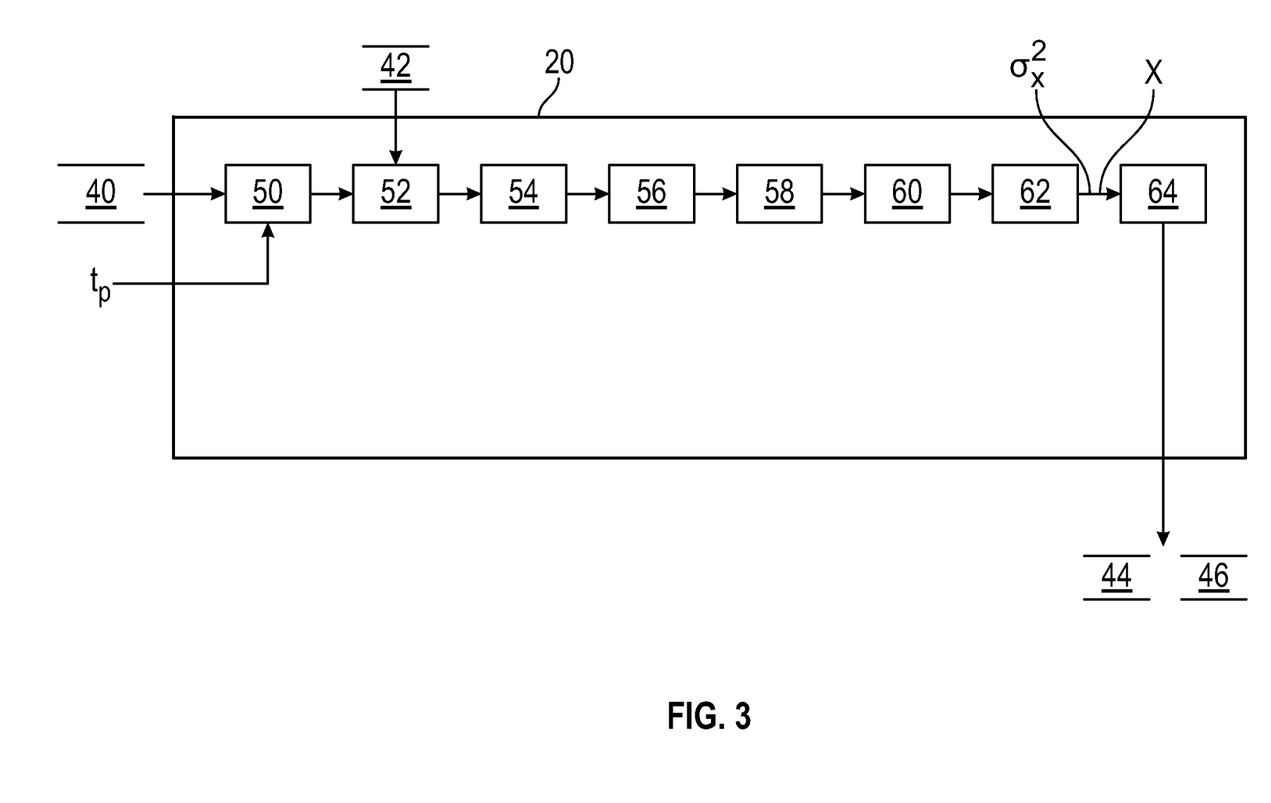
FIG. 3 is a block diagram of the one or more controllers shown in FIG. 1, according to an exemplary embodiment.

FIG. 3 is a block diagram of the one or more controllers 20 shown in FIG. 1. The one or more controllers 20 include a transform block 50, a concatenation block 52, a selector block 54, a regression model block 56, a solution block 58, a covariance block 60, a point block 62, and a fusion block 64. The transform block 50 receives the map lane edge points 40 as input. As mentioned above, the map lane edge points 40 are expressed in the global frame coordinate system. Therefore, the transform block 50 transforms the map lane edge points 40, which are expressed in the global frame coordinate system, into the ego frame coordinate system based on a pose transform at perception time $t_p$. The concatenation block 52 receives the transformed map lane edge points 40 and the perception lane edge points 42 as input and determines a concatenation of the map lane edge points 40 and the perception lane edge points 42. The concatenation block 52 transmits the concatenation of the map lane edge points 40 and the perception lane edge points 42 to the selector block 54.

Figure 4:
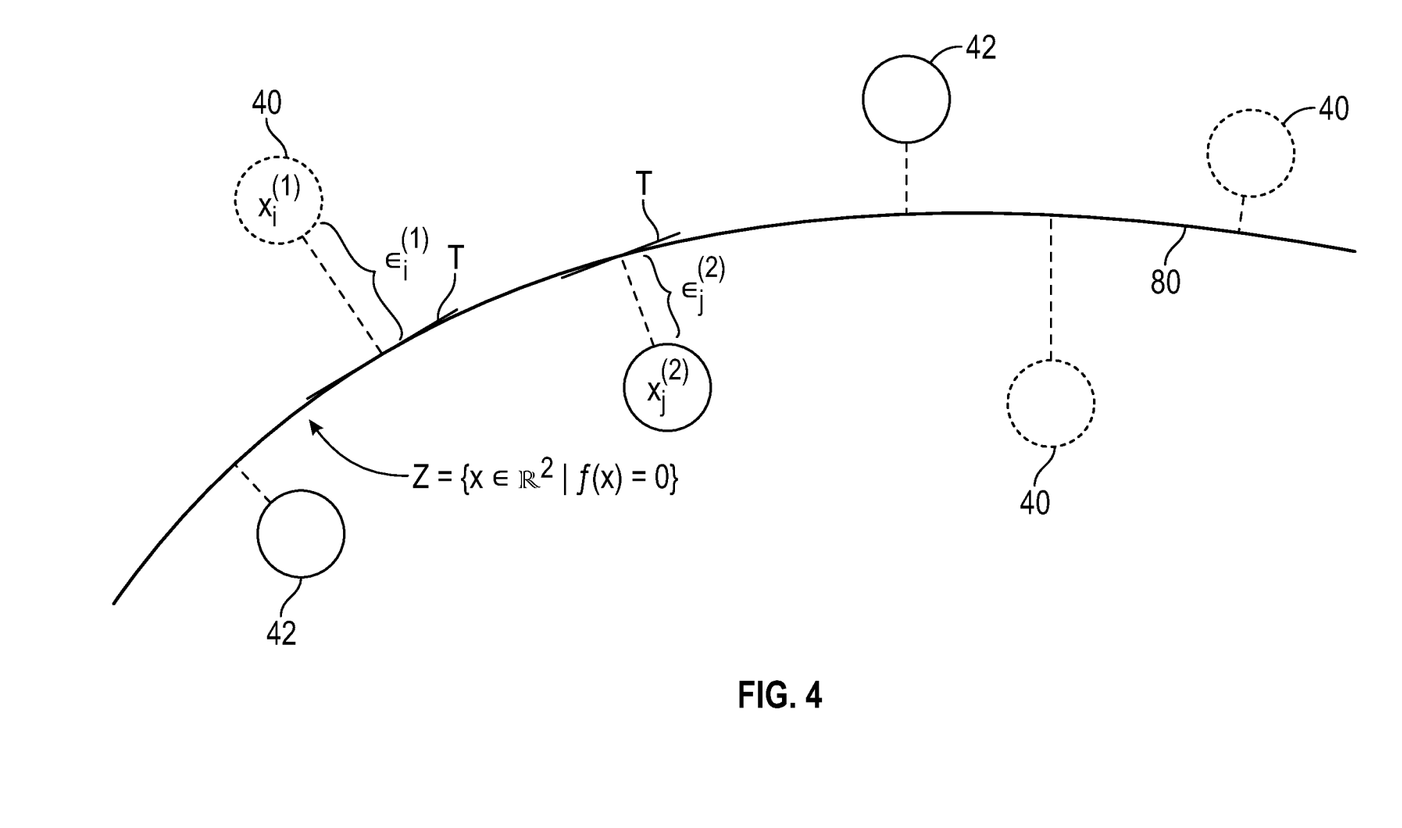
FIG. 4 illustrates a plurality of evaluation points that are positioned with respect to an implicit curve, according to an exemplary embodiment.

The selector block 54 then selects either a map lane edge point 40 or a perception lane edge point 42 from the from the concatenation of the map lane edge points 40 and the perception lane edge points 42 as an evaluation point x. The selector block 54 then transmits the evaluation point x to the regression model block 56. FIG. 4 illustrates a plurality of evaluation points $x_i$, $x_j$, where the map lane edge points 40 are represented as $x_i$ and the perception lane edge points 42 are represented as $x_j$. As seen in FIG. 4, an observation error $\epsilon_i$ corresponds to the evaluation point $x_i$ and an observation error $\epsilon_j$ corresponds to the evaluation point $x_j$. The observation errors $\epsilon_i$, $\epsilon_j$ are measured perpendicular with respect to a corresponding tangent T of the true position of a lane edge, where the true position of the lane edge is drawn as an implicit curve 80. It is to be appreciated that the evaluation points $x_i$, $x_j$ are heteroskedastic, which means that the variance of the observation errors $\epsilon_i$, $\epsilon_j$ vary between the evaluation points $x_i$, $x_j$.

Referring to both FIGS. 3 and 4, the regression model block 56 fits an implicit function $f(x)=0$ for a given evaluation point $x \in \mathbb{R}^2$, where the evaluation point x represents a map lane edge point 40, a perception lane edge point 42, or an arbitrary point that is proximate in distance to the implicit curve 80. Specifically, the implicit function $f(x)$ is fit based on an implicit moving least squares (MLS) approach that locally fits the map lane edge points 40 and the perception lane edge points 42 that surround a selected evaluation point x. The implicit curve 80 is represented as a zero-level set $\mathcal{Z}$ of the implicit function $f(x)$. That is, the true position of the lane edge is represented as the zero-level set $\mathcal{Z}$ of the implicit function $f(x)$. The zero-level set $\mathcal{Z}$ of the implicit function $f(x)$ is expressed in Equation 1, and the implicit function $f(x)$ is expressed in Equation 2 as:

$$\mathcal{Z} = \{x \in \mathbb{R}^2 \mid f(x) = 0\} \qquad \text{Equation 1}$$

$$f(x) = b(x)^T c(x) \qquad \text{Equation 2}$$

where $b(x)$ is a quadratic basis vector and $c(x)=c_x$ is a vector of a plurality of coefficients. The transpose of $c(x)$ is equal to $c_x^T=(c_0\ c_1\ c_2\ c_3)$, where $c_0$, $c_1$, $c_2$, $c_3$ represent the plurality of coefficients that are solved for based on the evaluation point x. It is to be appreciated that the plurality of coefficients $c_x$ are a function of the evaluation point x, which is a consequence of the implicit MLS approach. Therefore, the value of the plurality of coefficients $c_0$, $c_1$, $c_2$, $c_3$ change based on the specific evaluation point $x_i$ currently being evaluated.

The regression model block 56 selects the quadratic basis vector $b(x)$ as Equation 3:

$$b(x) = \begin{pmatrix} 1 \\ x_1 \\ x_2 \\ x_1 + x_2 \end{pmatrix} \qquad \text{Equation 3}$$

where $x_1$ represents the first component of vector x (e.g., the x-axis value) and $x_2$ represents the second component (e.g., the y-axis value). The quadratic basis vector $b(x)$ is selected to result in the implicit function $f(x)$ that represents the equation for a planar circle, which may be written in the form of Equation 4 as:

$$f(x) = c_0 + c_1 x + c_2 y + c_3(x^2 + y^2) = 0, \qquad \text{Equation 4}$$

where $x=x_1$ and $y=x_2$. It is to be appreciated that representing the implicit function by an equation for a planar circle is simple, does not require parameterization, and is relatively simple in nature to solve.

A gradient constraint is enforced at the zero-level set $\mathcal{Z}$, which is the implicit curve 80, to avoid a trivial solution $c_x=0$. Specifically, the gradient constraint is expressed as a magnitude squared of a gradient of the implicit function $f(x)$ that is equal to 1 where the evaluation point x belongs to the zero-level set z of the implicit function $f(x)$, and is expressed in Equation 5 as:

$$\|\nabla f(x)\|^2 = 1 \qquad \text{Equation 5}$$

where $$x \in \mathcal{Z},$$

and $$\mathcal{Z} = \{x \mid f(x) = 0\}$$

The magnitude squared of a gradient of the implicit function $f(x)$ is equivalent to a constraint based on the plurality of coefficients $c_x$, which is expressed by Equation 6 as:

$$c_x^T U c_x = 1 \qquad \text{Equation 6}$$

where U is represented by a 4×4 matrix in Equation 7 as:

$$U = \begin{pmatrix} 0 & 0 & 0 & 0 \\ 0 & 1 & 0 & 0 \\ 0 & 0 & 1 & 0 \\ -4 & 0 & 0 & 0 \end{pmatrix} \qquad \text{Equation 7}$$

The regression model block 56 then builds an error model, where the evaluation point x includes an error E', and is expressed in Equation 8 as:

$$\epsilon' \sim \mathcal{N}\left(0, \sum\right) \qquad \text{Equation 8}$$

where $\mathcal{N}$ represents the Normal distribution with zero mean and $\Sigma$ represents a covariance matrix. Assuming that the magnitude of the error $\|\epsilon'\|$ is negligible, the error $\epsilon'$ of the evaluation point x may be expressed in Equations 9 and 10 as:

$$f(x + \epsilon') \approx f(x) + \nabla f^T \epsilon' \qquad \text{Equation 9}$$

$$f(x + \epsilon') \approx f(x) + \epsilon \qquad \text{Equation 10}$$

where $\epsilon$ represents the observation error, such as the observation errors $\epsilon_i$, $\epsilon_j$ (shown in FIG. 4) and is the linearized scalar error in the implicit function $f(x)$. If the observation error $\epsilon$ is negligible, then a scalar error $\epsilon$ may be represented by Equations 11 and 12 as:

$$\mathbb{E}[f(x + \epsilon') - f(x)] \approx 0 \qquad \text{Equations 11 and 12}$$

so $$\epsilon \sim \mathcal{N}(0, \sigma^2)$$

where $\sigma^2$ is lateral error variance. The lateral error variance $\sigma^2$ may be expressed in Equation 13 as:

$$\sigma^2 = \nabla f^T \sum \nabla f \qquad \text{Equation 13}$$

It is to be appreciated that when the evaluation point x belongs to the zero-level set $\mathcal{Z}$, or $x \in \mathcal{Z}$, then the gradient constraint of $\|\nabla f(x)\|^2 = 1$ is satisfied, and the lateral error variance $\sigma^2$ represents the lateral error variance that is projected perpendicular to the implicit curve 80 shown in FIG. 4.

The solution block 58 then solves for the plurality of coefficients $c_x$ of the implicit function $f(x)$. Specifically, in one embodiment, the solution block 58 estimates a value of the plurality of coefficients $c_x$ of the implicit function $f(x)$ by solving an optimization problem that minimizes a Lagrangian function, which is expressed in Equation 14 as:

$$\hat{c}_x = \arg\min_{c_x} L(c_x) \quad \text{Equation 14}$$

where $L(c_x)$ represents the Lagrangian function. The Lagrangian function $L(c_x)$ is expressed in Equations 15 and 16 as:

$$L(c_x) = \frac{1}{2}\sum_i w_i \|f(x_i)\|^2_{\sigma_i^2} + \lambda(1 - c_x^T U c_x)$$

$$= \frac{1}{2}\sum_i w_i \sigma_i^{-2}[b(x_i)^T c_x]^2 + \lambda(1 - c_x^T U c_x)$$

where $w_i = k(x, x_i)$ is a value of a positive weighting function that is dependent on the evaluation point x, k represents a squared-exponential function, and $\lambda$ is the Lagrangian multiplier. It is to be appreciated that only a subset of observations within a predetermined distance of the evaluation point x have a non-zero weight. Consequently, certain values $w_i$ of the positive weighting function and the quadratic basis vector $b(x_i)$ will not require evaluation, and the optimization problem for the plurality of coefficients $c_x$ of the implicit function $f(x)$ is solved based on Equation 17:

$$\hat{c}_x = \frac{v_1}{\sqrt{v_1^T U v}} \quad \text{Equation 17}$$

where $v_1$ is an eigenvector corresponding to a smallest possible eigenvalue 11 of a 4×4 matrix, which is represented as $\psi$ and is solved in Equation 18 as:

$$\psi = (U + U^T)^{-1}\sum_I w_i \sigma_i^{-2} b(x_i) b(x_i)^T \quad \text{Equation 18}$$

and $\hat{c}_x$ is an estimated value of the plurality of coefficients $c_x$.

The above-mentioned approach for estimating the value of the plurality of coefficients $c_x$ of the implicit function $f(x)$ by solving the optimization problem that minimizes a Lagrangian function does not account for outliers in the map lane edge points $x_i$ and the perception lane edge points $x_j$ (shown in FIG. 4). Therefore, in an alternative approach for estimating the value of the plurality of coefficients $c_x$ of the implicit function $f(x)$, a first set of observed map lane edge points $N_1$ having the potential to contain outliers and a second set of observed map lane edge points $N_2$ that only contain inliers are considered, where a set of observed map lane edge points are expressed as $\{x_i\}_{i=0}^{N_1+N_2-1}$. A first loss function $\rho^{(1)}(e)$ is provided for the first set of observed map lane edge points $N_1$ and a second loss function $\rho^{(2)}(e)$ is provided for the second set of observed map lane edge points $N_2$. The Lagrangian function $L(c_x)$ is expressed in Equations 19 and 20 as:

$$L(c_x) = \frac{1}{2}\sum_i w_i \rho_i(\|f(x_i)\|_{\Sigma_i} + \lambda(1 - c_x^T U c_x) \quad \text{Equation 20}$$

where $$\rho_i(e) = \begin{cases} \rho^{(1)}(e) & 0 \le i < N_1 \\ \rho^{(2)}(e) & N_1 \le i < N_2 \end{cases}$$

The Lagrangian function $L(c_x)$ including the first and second loss functions $\rho^{(1)}(e)$, $\rho^{(2)}(e)$ is solved for based on an iterative reweighted least squares approach, where the Lagrangian function $L(c_x)$ is converted into a standard weighted least squares problem including a variance that is determined based on the lateral error variance $\sigma^2$ and an iterative reweighted least squares weight $s_i$, which is expressed in Equation 21 as:

$$\sigma_{LS,i}^{2,(n)} = \frac{\sigma^2}{s_i} \quad \text{Equation 21}$$

where $\sigma_{LS,i}^{2,(\pi)}$ represents the variance of the equivalent linear least squares problem at the current iteration. The iterative reweighted least squares weight $s_i$ is determined based on the magnitude of a Mahalanobis distance $\|\bar{e}_i\|$ and a derivative of the loss function $\rho'(|\bar{e}_i^{n-1}|)$ is expressed in Equation 22. The Mahalanobis distance $\|e_i\|$ is based on the lateral error variance $\sigma_i$, a transform of the quadratic basis vector $b(x)$, and the estimated value of the plurality of coefficients $c_x$, and is expressed in Equation 23 as:

$$s_i = \frac{\rho'(\|\bar{e}_i^{n-1}\|)}{\|\bar{e}_i^{n-1}\|} \quad \text{Equation 22}$$

$$\|\bar{e}_i\| = \frac{|b_i^T \hat{c}_x|}{\sigma_i} \quad \text{Equation 23}$$

where n represents the current iteration number. The solution block 58 then solves for the plurality of coefficients $c_x$ of the implicit function $f(x)$ based on the iterative reweighted least squares approach until convergence, where the magnitude of the estimated value of the plurality of coefficients $c_x$ changes less than a predetermined threshold amount. The predetermined threshold amount is determined based on specific accuracy requirements of an autonomous driving system of the autonomous vehicle 12.

The covariance block 60 then estimates a covariance of the plurality of coefficients $c_x$ based on an optimization problem that minimizes a Lagrangian function, which is expressed in Equation 24 as:

$$c_x = \arg\min_c L(z, c) \quad \text{Equation 24}$$

where $L(z, c)$ represents the Lagrangian function and z represents noisy observations. The covariance for the plurality of coefficients $c_x$ is solved for based on Equation 25:

$$\Sigma_c \approx \left(\frac{\partial^2 L}{\partial c^2}\right)^{-1} \left(\frac{\partial^2 L}{\partial z \partial c}\right) \Sigma_z \left(\frac{\partial^2 L}{\partial z \partial c}\right)^T \left(\frac{\partial^2 L}{\partial c^2}\right)^{-1} \quad \text{Equation 25}$$

where $\Sigma_c$ is the covariance for the plurality of coefficients $c_x$, $\Sigma_z$ is the covariance for the noisy observations z, and the partial derivatives and evaluated at the expected values of the noisy observations z. The Lagrangian function L(z, c) is determined based on the last iteration of an iterative reweighted least squares approach, and expressed in Equation 26 as:

$$L(z, c) = \frac{1}{2}(B^T c - z)^T W \Sigma_z^{-1} (B^T c - z) + \lambda(1 - c^T U c) \quad \text{Equation 26}$$

where Equation 26 has utilized a linearized error model to include additive pseudo observations $z \sim \mathcal{N}(0, \Sigma_z)$, W is the diagonal matrix of the positive weighting function $w_i$, or W=diag($\{w_i\}$), B represents a matrix formed by stacking basis vectors at each point so that B satisfies B=($b_1$ $b_2$ ... ), and the covariance for the noisy observations 22 is the diagonal matrix of the lateral error variance $\sigma_i$ squared, or $\Sigma_z$=diag($\{\sigma_i^2\}$).

The partial derivatives in Equation 25 are expressed in Equations 27, 28, and 29 as:

$$\frac{\partial L}{\partial c} = (B^T c - z)^T \Phi^T B^T - \lambda c^T (U + U^T) \quad \text{Equation 27}$$

$$\frac{\partial^2 L}{\partial c^2} = B \Phi B^T - \lambda(U + U^T) \quad \text{Equation 28}$$

$$\frac{\partial^2 L}{\partial z \partial c} = -B\Phi \quad \text{Equation 29}$$

where $\phi$ represents a constant that provides conciseness to the partial derivatives and is expressed in Equation 30 as:

$$\Phi = \frac{1}{2}\left(W \Sigma_z^{-1} + W \Sigma_z^{-1}\right) = W \Sigma_z^{-1} \quad \text{Equation 30}$$

Accordingly, Equations 25, 27, 28, 29, and 30 are combined to create an equation that estimates the covariance $\Sigma_c$ for the plurality of coefficients $c_x$ is expressed in Equation 31 as:

$$\Sigma_c \approx K^{-1} B W \Sigma_z^{-1} W B^T K^{-1} \quad \text{Equation 31}$$

where K represents a constant that provides conciseness to the covariance $\Sigma_c$ and is expressed in Equation 32:

$$K = B W \Sigma_z^{-1} B^T - \lambda_1(U + U^T) \quad \text{Equation 32}$$

where $\lambda_1$ represents the Lagrangian multiplier for the smallest eigenvalue and $\lambda_1 = \lambda$. Equations 31 and 32 are combined together to create an equation that estimates the covariance $\Sigma_c$ for the plurality of coefficients $c_x$ is expressed in Equation 33 as:

$$\Sigma_c \approx \left(B W \Sigma_z^{-1} B^T\right)^{-1} B W \Sigma_z^{-1} W B^T \left(B W \Sigma_z^{-1} B^T\right)^{-1} \quad \text{Equation 33}$$

Once the covariance block 60 estimates the covariance $\Sigma_c$ for the plurality of coefficients $c_x$, the point block 62 then determines a point x on the implicit curve 80 defined by the zero-level set z of the implicit function $f(x)$ that is nearest to a given point x̃. The point x represents one of the fused lane edge points 44 (seen in FIG. 2C) that create the fused lane edge 46. The given point x̃ represents a starting point of an iterative process for calculating the point x. The point x is determined by finding a local fit of the implicit curve 80 by solving for Equation 34, which is expressed as:

$$f_0(\widetilde{x_0}) = b(\widetilde{x_0})^T \quad \text{Equation 34}$$

where $$\widetilde{x_0} = x_0$$

where $f_0(\widetilde{x_0})$ represents the implicit function $f(x)$ evaluated at an initial given point $\widetilde{x_0}$, where the initial given point $\widetilde{x_0}$ is equal to an initial point $x_0$. It is to be appreciated that since the implicit function $f(x)$ is represented by an equation for a planar circle (Equation 4), the next given point $\widetilde{x_1}$ for which the implicit function $f(x)$ evaluated at an initial given point $\widetilde{x_0}$ is set to zero, or $f_0(\widetilde{x_0})=0$. The point x is calculated iteratively based on an iterative process by finding the local fit of the implicit curve 80 until the point x is approximately equal to the given point x̃, or x≈x̃$_m$, where x̃$_n$ represents a given point % at iteration n.

A lateral error variance $\sigma_x^2$ at the point x is determined based on the covariance $\Sigma_c$ for the plurality of coefficients $c_x$ is expressed in Equation 35 as:

$$\sigma_x^2 = J \Sigma_c J^T \quad \text{Equation 35}$$

where J is the Jacobian matrix with respect to the vector of the plurality of coefficients ($c_0$, $c_1$, $c_2$, $c_3$) of a function r(c) that represents a radius of a surface given the vector of the plurality of coefficients ($c_0$, $c_1$, $c_2$, $c_3$) expressed in Equation 36 as:

$$r(c) = \sqrt{\frac{c_1^2 + c_2^2}{2c_3^2} - c_0/c_3} \quad \text{Equation 36}$$

For each point x that is evaluated as part of the iterative process, the plurality of coefficients $c_0$, $c_1$, $c_2$, $c_3$ that are part of the implicit function $f(x)$ are solved for as a function of the evaluation point x based on a least squares approach, where the coefficients $c_0$, $c_1$, $c_2$, $c_3$ are solved based on center coordinates $x_{center}$ and a radius r of the planar circle that represents the implicit function $f(x)$, and are expressed in Equations 37 and 38 as:

$$x_{center} = -\frac{1}{2c_3}(c_1 \, c_2)^T \quad \text{Equation 37}$$

$$r = \sqrt{x_{center}^T x_{center} - \frac{c_0}{c_3}} \qquad \text{Equation 38}$$

where a next point $\tilde{x}_{n+1}$ on the planar circle representing the implicit function $f(x)$ that is nearest to $\tilde{x}_n$ is determined based on Equation 39 as:

$$\tilde{x}_{n+1} = x_{center} + \frac{\tilde{x}_n - x_{center}}{\|\tilde{x}_n - x_{center}\|} r \qquad \text{Equation 39}$$

where the next point $\tilde{x}_{n+1}$ represents the next point that is selected for evaluation by the selector block 54.

The fusion block 64 receives the lateral error variance $\sigma_x^2$ at the point x and the point x from the point block 62. The fusion block 64 builds the fused lane edge 46 (FIG. 2C) by setting the point x as one of the fused lane edge points 44. The fusion block 64 continues to add fused lane edge points 44 to the fused lane edge 46 until all the map lane edge points 40 and the perception lane edge points 42 have been considered. It is to be appreciated that in embodiments, a latency computation may be performed. Specifically, the fusion block 68 may determine a delta transform that compensates for latency based on a difference between the pose transform at the current time $t_n$ and the pose transform at the perception time $t_p$, where the delta transform is used to propagate to the current time $t_n$.

Referring generally to the figures, the disclosed lane edge fusion system provides various technical effects and benefits. Specifically, the disclosed lane edge fusion system may build the fused lane edge without ordering, associating, or parameterizing the input points. Furthermore, the disclosed lane edge fusion system accounts for the heteroskedastic nature of the evaluation points, which include variance in the observation errors between the evaluation points. The true position of the lane edge is represented by an implicit function that is an equation for a planar circle, which is simple, does not require parameterization, and is relatively simple in nature to solve. Moreover, it is also to be appreciated that the disclosed lane edge fusion system may be used with two-dimensional data (top-down) as well as three-dimensional data (with elevation).

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A lane edge fusion system for an autonomous vehicle, the lane edge fusion system comprising:
   one or more controllers executing instructions to:
      receive perception data and map data of a roadway the autonomous vehicle is traveling along;
      derive a plurality of map lane edge points from the map data and a plurality of perception lane edge points from the perception data;
      select an evaluation point based on the plurality of map lane edge points and the plurality of perception lane edge points, wherein a true position of a lane edge is represented as an implicit curve;
      fit an implicit function for the evaluation point based on an implicit moving least squares approach, wherein the implicit curve is represented by a zero-level set of the implicit function and the implicit function is represented by an equation for a planar circle;
      solve for a plurality of coefficients of the implicit function, wherein the plurality of coefficients are a function of the evaluation point;
      estimate a covariance of the plurality of coefficients;
      determine a point on the implicit curve that is nearest to a given point based on an iterative process;
      determine a lateral error variance at the point based on the covariance for the plurality of coefficients; and
      build a fused lane edge by setting the point on the implicit curve as one of a plurality fused lane edge points that are fused together to create the fused lane edge.

2. The lane edge fusion system of claim 1, wherein the implicit function is expressed as:

$$f(x) = b(x)^T c(x)$$

wherein $f(x)$ represents the implicit function, $b(x)$ represents a quadratic basis vector, and $c(x)$ is equal to a vector of the plurality of coefficients $c_x$.

3. The lane edge fusion system of claim 2, wherein the equation of the planar circle is expressed as:

$$f(x) = c_0 + c_1 x + c_2 y + c_3 (x^2 + y^2) = 0$$

wherein $c_0$, $c_1$, $c_2$, $c_3$ represent the plurality of coefficients, $x=x_1$, and $y=x_2$.

4. The lane edge fusion system of claim 1, wherein the evaluation point includes an error expressed as:

$$\epsilon' \sim \mathcal{N}(0, \Sigma)$$

wherein $\epsilon'$ represents the error, $\mathcal{N}$ represents the Normal distribution with zero mean, and $\Sigma$ represents a covariance matrix.

5. The lane edge fusion system of claim 1, wherein the plurality of coefficients are estimated based on a Lagrangian function including a first loss function and a second loss function.

6. The lane edge fusion system of claim 1, wherein the covariance of the plurality of coefficients is estimated based on an optimization problem that minimizes a Lagrangian function and is expressed as:

$$c_x = \mathrm{argmin}_c L(z, c)$$

wherein $c_x$ represents the plurality of coefficients, L(z, c) represents the Lagrangian function, and z represents noisy observations.

7. The lane edge fusion system of claim 1, wherein the covariance of the plurality of coefficients is expressed as:

$$\sum_c \approx BW \sum z - 1BT - 1BW \sum z - 1WBTBW \sum z - 1BT - 1$$

wherein $\Sigma c$ represents the covariance of the plurality of coefficients, B represents a matrix formed by stacking basis vectors at each point so that B satisfies B=(b1b2 ... ), W is a diagonal matrix of a positive weighting function wi, and $\Sigma z$ represents a covariance for noisy observations.

8. The lane edge fusion system of claim 1, wherein the lateral error variance at the point is determined based on:

$$\sigma_x^2 = J \sum_c J^T$$

wherein $\sigma_x^2$ is the lateral error variance, $\Sigma_c$ is the covariance for the plurality of coefficients, and J is a Jacobian matrix with respect to a vector of the plurality of coefficients ($c_0$, $c_1$, $c_2$, $c_3$) of a function r(c) that represents a radius of a surface given the vector of the plurality of coefficients ($c_0$, $c_1$, $c_2$, $c_3$).

9. The lane edge fusion system of claim 8, wherein the function r(c) is expressed as:

$$r(c) = \sqrt{\frac{c_1^2 + c_2^2}{2c_3^2} - c_0/c_3}.$$

10. The lane edge fusion system of claim 1, wherein for each point that is evaluated as part of the iterative process, the plurality of coefficients are solved for based on:

$$x_{center} = -\frac{1}{2c_3}(c_1 \quad c_2)^T$$

wherein $x_{center}$ represents center coordinates of the planar circle and $c_1$, $c_2$ represent the plurality of coefficients.

11. The lane edge fusion system of claim 10, wherein for each point that is evaluated as part of the iterative process, the plurality of coefficients are solved for based on:

$$r = \sqrt{x_{center}^T x_{center} - \frac{c_0}{c_3}}$$

wherein r represents a radius of the planar circle and $c_0$, $c_3$ represent the plurality of coefficients.

12. The lane edge fusion system of claim 11, wherein a next point on the planar circle nearest to a given point at iteration n is determined based on:

$$\tilde{x}_{n+1} = x_{center} + \frac{\tilde{x}_n - x_{center}}{\|\tilde{x}_n - x_{center}\|} r$$

wherein $\tilde{x}_{n+1}$ represents the next point that is selected for evaluation and $\tilde{x}_n$ represents a given point at the iteration n.

13. The lane edge fusion system of claim 1, wherein a gradient constraint is enforced at the zero-level set of the implicit function.

14. The lane edge fusion system of claim 13, wherein the gradient constraint is expressed as a magnitude squared of a gradient of the implicit function, wherein the implicit function is equal to 1, and the evaluation point belongs to the zero-level set of the implicit function.

15. The lane edge fusion system of claim 1, wherein the fused lane edge defines a shape of a lane located along the roadway that the autonomous vehicle travels along.

16. A lane edge fusion system for an autonomous vehicle, the lane edge fusion system comprising:
  one or more controllers executing instructions to:
    receive perception data and map data of a roadway the autonomous vehicle is traveling along;
    derive a plurality of map lane edge points from the map data and a plurality of perception lane edge points from the perception data;
    select an evaluation point based on the plurality of map lane edge points and the plurality of perception lane edge points, wherein a true position of a lane edge is represented as an implicit curve;
    fit an implicit function for the evaluation point based on an implicit moving least squares approach, wherein the implicit curve is represented by a zero-level set of the implicit function and the implicit function is represented by an equation for a planar circle, and wherein a gradient constraint is enforced at the zero-level set of the implicit function;
    solve for a plurality of coefficients of the implicit function, wherein the plurality of coefficients are a function of the evaluation point and are estimated based on a Lagrangian function including a first loss function and a second loss function;
    estimate a covariance of the plurality of coefficients;
    determine a point on the implicit curve that is nearest to a given point based on an iterative process;
    determine a lateral error variance at the point based on the covariance for the plurality of coefficients; and
    build a fused lane edge by setting the point on the implicit curve as one of a plurality fused lane edge points that are fused together to create the fused lane edge, and wherein the fused lane edge defines a shape of a lane located along the roadway that the autonomous vehicle travels along.

17. The lane edge fusion system of claim 16, wherein the lateral error variance at the point is determined based on:

$$\sigma_x^2 = J \sum_c J^T$$

wherein $\sigma_x^2$ is the lateral error variance, $\Sigma_c$ is the covariance for the plurality of coefficients, and J is a Jacobian matrix with respect to a vector of the plurality of coefficients ($c_0$, $c_1$, $c_2$, $c_3$) of a function r(c) that represents a radius of a surface given the vector of the plurality of coefficients ($c_0$, $c_1$, $c_2$, $c_3$).

18. The lane edge fusion system of claim 17, wherein the function r(c) is expressed as:

$$r(c) = \sqrt{\frac{c_1^2 + c_2^2}{2c_3^2} - c_0/c_3}.$$

19. The lane edge fusion system of claim 16, wherein the gradient constraint is expressed as a magnitude squared of a gradient of the implicit function, wherein the implicit function is equal to 1, and the evaluation point belongs to the zero-level set of the implicit function.

20. A lane edge fusion system for an autonomous vehicle, the lane edge fusion system comprising:
one or more controllers executing instructions to:
receive perception data and map data of a roadway the autonomous vehicle is traveling along;
derive a plurality of map lane edge points from the map data and a plurality of perception lane edge points from the perception data;
select an evaluation point based on the plurality of map lane edge points and the plurality of perception lane edge points, wherein a true position of a lane edge is represented as an implicit curve;
fit an implicit function for the evaluation point based on an implicit moving least squares approach, wherein the implicit curve is represented by a zero-level set of the implicit function and the implicit function is represented by an equation for a planar circle, and wherein a gradient constraint is enforced at the zero-level set of the implicit function and is expressed as a magnitude squared of a gradient of the implicit function, wherein the implicit function is equal to 1, and the evaluation point belongs to the zero-level set of the implicit function;
solve for a plurality of coefficients of the implicit function, wherein the plurality of coefficients are a function of the evaluation point and are estimated based on a Lagrangian function including a first loss function and a second loss function;
estimate a covariance of the plurality of coefficients;
determine a point on the implicit curve that is nearest to a given point based on an iterative process;
determine a lateral error variance at the point based on the covariance for the plurality of coefficients, wherein the lateral error variance at the point is determined based on:

$$\sigma_x^2 = J \sum_c J^T$$

wherein $\sigma_x^2$ is the lateral error variance, $\Sigma_c$ is the covariance for the plurality of coefficients, and J is a Jacobian matrix with respect to a vector of the plurality of coefficients ($c_0$, $c_1$, $c_2$, $c_3$) of a function r(c) that represents a radius of a surface given the vector of the plurality of coefficients ($c_0$, $c_1$, $c_2$, $c_3$); and
build a fused lane edge by setting the point on the implicit curve as one of a plurality fused lane edge points that are fused together to create the fused lane edge, and wherein the fused lane edge defines a shape of a lane located along the roadway that the autonomous vehicle travels along.

* * * * *